United States Patent

Hill

[11] 3,814,001
[45] June 4, 1974

[54] AIR VENT IN VEHICLE COMPARTMENT PANEL

[75] Inventor: Robert T. Hill, Dayton, Ohio

[73] Assignee: General Motors Corporation, Detroit, Mich.

[22] Filed: July 18, 1972

[21] Appl. No.: 272,986

[52] U.S. Cl. .................................. 98/2, 98/40 A
[51] Int. Cl. ...................... B60h 1/24, F24f 13/06
[58] Field of Search ............................... 98/2, 40 A

[56] References Cited
UNITED STATES PATENTS

| | | | |
|---|---|---|---|
| 3,103,155 | 9/1963 | Boylan et al. | 98/40 A |
| 3,276,347 | 10/1966 | Atkinson et al. | 98/2 |
| 3,319,560 | 5/1967 | Schaff | 98/40 A |
| 3,461,791 | 8/1969 | Bever | 98/2 |

*Primary Examiner*—Meyer Perlin
*Assistant Examiner*—Paul Devinsky
*Attorney, Agent, or Firm*—Charles R. Engle

[57] ABSTRACT

A vehicle passenger compartment air vent arrangement wherein an air vent nozzle is frictionally retained within an elastomeric foam padded trim or instrument panel. The elastomeric foam is molded on the panel and is covered with a layer of thermal setting plastic material. The padded panel is molded containing a pre-sized socket for receiving an air vent nozzle assembly. The air vent nozzle and the socket have comparative dimensions such that the nozzle can be inserted through an expansible throat area of the socket and be rotated therein for directing the flow of air into the vehicle passenger compartment. The air vent nozzle is retained in the socket by frictional forces of the foam and its cover as their elastomeric qualities require them to contact in an attempt to return to their original unexpanded molded positions. The retaining frictional force provided by the elastomeric qualities of these materials is sufficiently low to allow an occupant of the vehicle to manually position the nozzle while being sufficiently high to retain the nozzle in any adjusted position. Since the thermal setting plastic cover is molded over the entire socket area, no finishing moldings are required.

1 Claim, 5 Drawing Figures

AIR VENT IN VEHICLE COMPARTMENT PANEL

This invention relates to a vehicle air vent and more particularly to such a vent including a nozzle movably mounted and frictionally retained in a preformed molded aperture in an elastomeric foam padded vehicle instrument panel.

The mounting of an air vent nozzle in a vehicle instrument panel usually requires incorporation of a mounting frame to provide an assembly having a pleasing appearance. Utilization of a mounting frame to cover the edges of the aperture through the padded instrument panel necessarily includes more material, additional assembly operations, and further requires a specific fastening device to retain the nozzle in place. In such structures, the air vent nozzle assembly must also include elements movable relative to the frame so that the passenger may direct the flow of air as desired. Accordingly, a purpose of this invention is to provide an air vent nozzle arrangement eliminating the necessity of a mounting frame to cover the edge portions of an aperture through the padded instrument panel. Another purpose of this invention is also to provide an assembly wherein the air vent nozzle is easily mounted within a socket extending through the padded instrument panel and yet is capable of being moved to an adjusted position while being retained therein by elastomeric qualities of the materials forming a padded vehicle instrument or trim panel.

Accordingly, a general object of the subject invention is the provision of a socket in an aperture through a padded vehicle compartment panel when the instrument panel is initially formed so that a thermal setting plastic covering material of the panel provides a finished surface on the walls of the panel defining the aperture and the socket area.

A further object of this invention is the provision of an elastomeric material padded vehicle compartment panel having an aperture therethrough, the surfaces of the pad defining the aperture being covered with a layer of thermal setting plastic material and including a socket area capable of frictionally receiving and retaining an air vent nozzle assembly.

Another object of this invention is the provision of a socket area in surfaces of an elastomeric material padded vehicle instrument panel defining an aperture, the socket having a predetermined dimension and receiving an air vent nozzle which has a predetermined greater dimension such that the portions of the elastomeric pad defining the socket are expanded and frictionally retain the socket in place by the tendency of the elastomeric pad to return to its original unexpanded shape.

A further object of this invention is the provision of an elastomeric plastic foam padded vehicle instrument panel having at least one molded aperture therethrough, a socket area formed in the surface of the pad defining the aperture and having a predetermined dimension, the socket area receiving a layer of fibrous material having predetermined frictional characteristics, an air vent nozzle assembly having a dimension greater than that of the socket area so that assembly of the nozzle within the socket expands the foam material which by its elastomeric qualities applies a contemplated force against the fibrous material urging it into continuous engagement with the nozzle retaining it within the socket in any adjusted position.

A still further object of this invention is the provision of an instrument panel having a supporting panel including a cup-shaped portion covered with an elastomeric foam material, the foam being covered with a layer of thermal setting plastic material defining an aperture through the foam material and the instrument panel, a socket area molded in the foam material and having a predetermined dimension so that when it receives an air vent nozzle of similar shape but of a size slightly greater than the socket area, the foam material is expanded applying a frictional force against the outer surfaces of the nozzle by its elastomeric qualities retaining the nozzle in a manually selected position.

A more complete understanding of the present invention may be had from the following detailed description which should be taken in conjunction with the drawings in which.

Figure 1:
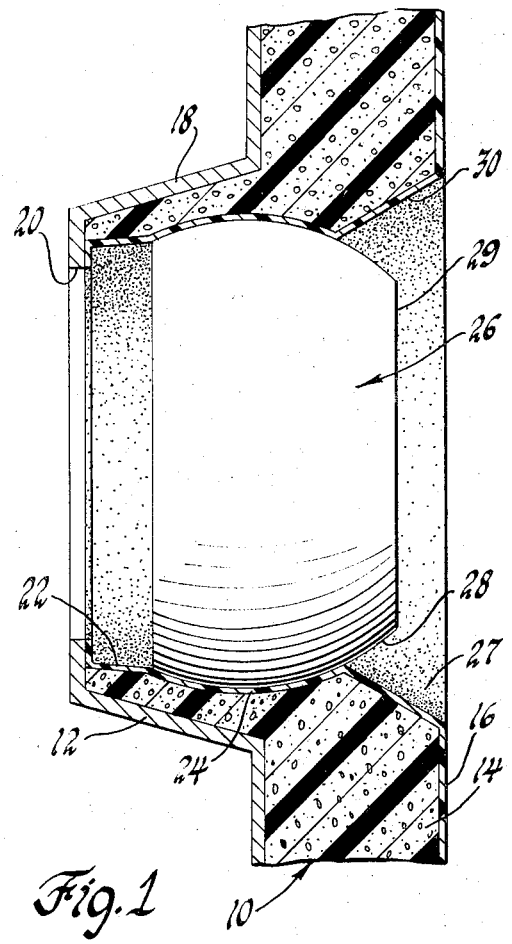
FIG. 1 is a partial cross sectional view illustrating a portion of a padded vehicle instrument panel defining an aperture and socket containing an air vent nozzle in accordance with the subject invention.
Figure 2:
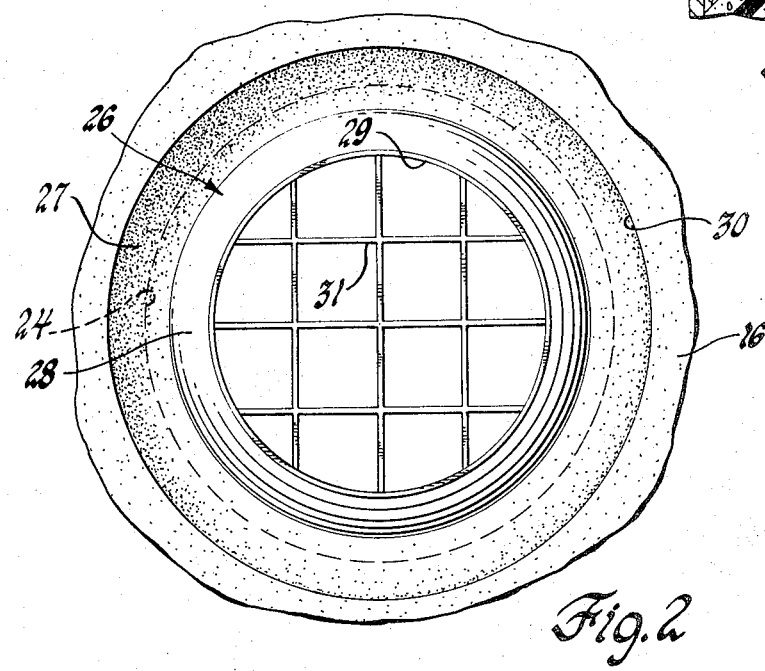
FIG. 2 is a fragmentary elevational view illustrating the air exiting portion of the air vent nozzle.

Referring now to the drawings, with particular reference to FIG. 1, a padded vehicle instrument panel assembly 10 includes a metal backing or support panel 12 having an elastomeric foam material 14 molded thereon which is in turn covered by a layer 16 of thermal setting material. A polyurethane foam is a preferred elastomeric material forming the layer 14 of foam material while the layer 16 is preferably formed of a thermal setting vinyl plastic material. The support panel 12 is deformed in the form of a cup-shaped portion 18, the surfaces of which are also covered with the foam material 14 and the layer 16. An aperture 20 is formed in the backing member 12 and is also defined by a surface 22 of the layer 16 which extends over portions of the elastomeric foam material 14 extending into the cup-shaped portion 18. The surface 22 defining a portion of the aperture through the padded instrument panel 10 contains a socket area 24 having predetermined dimensions as will be later described. An air vent nozzle body assembly 26, in the form of a sphere, has a predetermined dimension slightly greater than that of the socket area 24 and when inserted within the socket expands the elastomeric foam material 14 and its associated cover layer 16 as illustrated in FIG. 1. A throat area 27 including tapered surfaces 30 is provided to allow insertion of the nozzle assembly 26 within socket area 24. A preferred method of installing the nozzle assembly 26 in place is to insert it within the socket area 24 and then rotate it into the position shown in FIGS. 1 and 2 whereby the foam material 14 is expanded outwardly away from the aperture 20. The nozzle assembly 26 presents an effective air flow area 29 including an air grill 31 shown in FIG. 2. Expansion of the elastomeric foam material 14, which for purposes of illustration can be polyurethane foam, results in a continuous frictional resistive force being applied against outer surface 28 of the nozzle body assembly 26. This frictional resistive force is created by molding the socket area 24 in the padded instrument assembly 10 so as to have a size slightly less than that of the nozzle assembly 26 as well as the tendency of the polyurethane foam or the elastomeric foam material tending to return to its original molded position. The size of the socket area and the nozzle assembly 26 can be predetermined so as to provide a specific resistive force whereby the nozzle assembly 26 is capable of being manually positioned by an occupant of the vehicle to direct air through the nozzle as desired. The resistive force, of course, is sufficient to retain the nozzle assembly 26 in any adjusted position.

Insertion of the nozzle assembly 26 within socket area 24 results in rapid assembly of the vent nozzle within the instrument panel and simultaneously provides a finished appearance to the assembly. This is due to the fact that the layer 16 of thermal setting material, in preferred form a vinyl composition, completely covers the exposed surfaces of the polyurethane foam material 14. The vinyl layer 16 also extends into engagement with the support panel 12 adjacent the aperture 20 thereby preventing any exposed surfaces of the foam or the backing member in the vicinity of the aperture 20.

Figure 3:
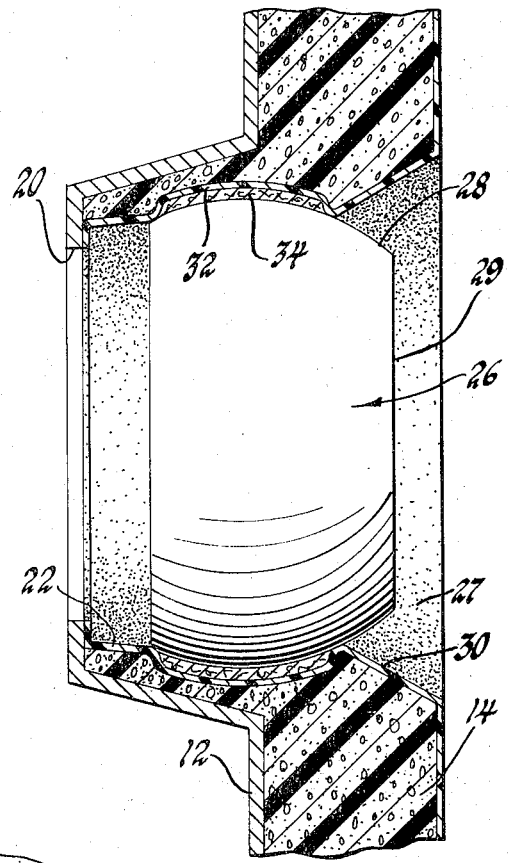
FIG. 3 is a partial sectional view illustrating a modification of the subject invention wherein a layer of fibrous material is placed in the socket area of the pad surfaces defining the aperture, the fibrous material engaging the outer surface of the air vent nozzle.

With reference to FIG. 3, the surface 22 of the padded instrument assembly 10 defining aperture 20 can be molded to form a socket area 32, which like the socket area 24 in FIG. 1, has a predetermined configuration. The socket area 32 is slightly oversized relative to the vent nozzle assembly 26 so that it is capable of receiving a layer of fibrous material 34 which is in engagement with the outer surface 28 of the vent nozzle assembly 26 when installed within the socket area 32. The layer of fibrous material 34 can be a felt composition or like material so that it provides a predetermined frictional engagement with outer surface 28 of the nozzle assembly 26. Use of various materials such as the felt layer 34 provides for the selection of a material developing desirable resistance characteristics when the foam material 14 urges the layer 34 against outer nozzle surface 28. The only limitation upon the use of the material 34 is that it operate in conjunction with the force created by the tendency of the elastomeric foam material to return to its original molded shape so as to provide a frictional force within limits capable of providing for manual adjustment of the nozzle assembly 26.

Figure 4:
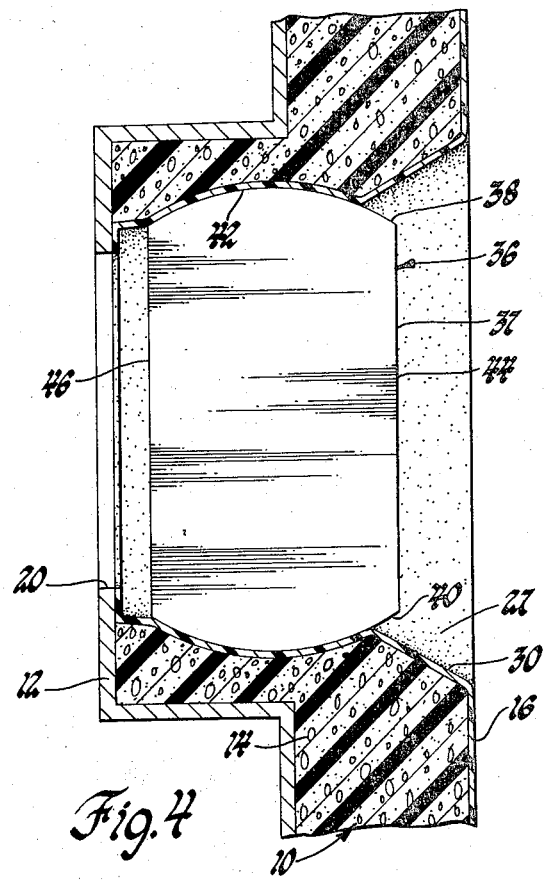
FIG. 4 is a partial sectional view illustrating a further modification of the subject invention wherein the air vent nozzle is in the form of a segment of a cylinder.
Figure 5:
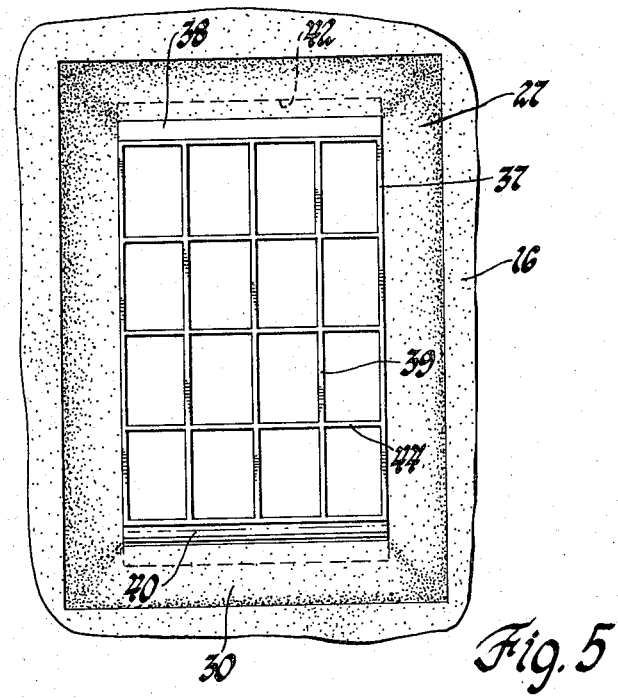
FIG. 5 is a partial elevational view illustrating the rectangular discharge area of the air nozzle of FIG. 4.

With reference to FIG. 4, wherein like parts are given like reference numerals, a modified nozzle body assembly 36 is shown wherein a rectangular vent area 37 containing a grill 39 best shown in FIG. 5 is provided. In this configuration, the air vent nozzle body is in the form of a segment of a cylinder, the arcuate surfaces 38 and 40 of which are received in a socket area 42 of the padded instrument assembly 10. The cut away surfaces 44 and 46 of the cylindrical segment present the rectangular air discharge area 37 indicated in FIG. 5. It is obvious that this configuration presents a greater area of air flow for more rapid ventilation of a vehicle passenger compartment. Also in this embodiment, the socket area 42 is of a predetermined size slightly less than the diameter of the arcuate surfaces 38 and 40 of the nozzle assembly 36 so that the foam material 14 is expanded when the nozzle assembly is inserted within the socket area 42 causing it to apply a predetermined resistive force against the arcuate surfaces 38 and 40.

While I have shown and described specific embodiments of the present invention it will, of course, be understood that various modifications and alternative constructions may be made without departing from the true spirit and scope of this invention. In particular it is possible to form the air vent nozzle of many configurations, the only necessity being that the socket area have a dimension slightly less than that of the portion of the nozzle received therein so that the elastomeric material can apply the necessary resistive force retaining the nozzle assembly in any manually adjusted position. While I have specifically mentioned the use of a polyurethane foam and a vinyl covering material, it is of course apparent that any elastomeric material can be utilized to provide the required resistive force retaining the nozzle. Likewise, any appropriate covering material can be used in conjunction with the elastomeric material to provide a finished appearance to the assembled combination.

It is significant that this invention does provide a padded vehicle instrument or trim panel wherein an aperture of a predetermined size is molded therein and includes a socket area of a specific dimension for receipt of an air vent nozzle assembly likewise having a predetermined size. The respective dimensions are determined such that the air vent nozzle can be inserted within the socket area and rotated into place expanding the elastomeric foam material positively retaining the nozzle in any adjusted position. In one application the socket area in the padded instrument panel was molded to have a spherical diameter of 3.2 inches. The socket area was filled with a layer of felt having approximately 0.2 inches thickness. An air vent nozzle assembly having a spherical diameter of 3.04 inches was placed within the socket area expanding its throat area from 2.8 inches to the 3.04 inches or by 0.24 inches when inserted. The elastomeric foam material and the felt layer applied a desired resistive force sufficient to retain the nozzle assembly in any manually adjusted position.

The above description is intended for purposes of illustration only and therefore the scope of this invention is not intended to be limited except as required by the following appended claims.

I claim:

1. A padded vehicle panel for use in a passenger compartment having a finished trim surface and of the type having at least one manually adjustable air vent therein comprising in combination: a support panel having at least one air vent aperture therein; a pad formed of a layer of an elastomeric plastic foam having a predetermined thickness secured to said support panel; said pad having at least one air vent aperture therein in alignment with the aperture in said support panel; said pad including a circumferential surface defining said air vent aperture; said pad air vent aperture having a specific predetermined dimension; said pad circumferential surface containing an arcuate recessed area defining a socket having a predetermined dimension; a cover layer of thermal setting plastic material covering and being secured to said pad including said circumferential surface and said socket defining said air vent aperture providing a finished trim surface; and an air vent nozzle directing air into the passenger compartment, said nozzle being positioned within said socket and having a body with an arcuate exterior surface having a predetermined dimension greater than that of said socket, said nozzle body expanding said circumferential surface and said socket when placed therein whereby said surface contracts retaining said nozzle body within said pad air vent aperture and said arcuate recessed area of said socket frictionally engaging said nozzle body exterior surface retaining the body in any manually adjusted position.

* * * * *